UNITED STATES PATENT OFFICE 2,190,733

MANUFACTURE OF ALKYL SUBSTITUTED ARYL SULPHATES

Joseph L. Richmond, Woodstown, N. J., assignor to E. I. du Pont de Nemours & Company, Wilmington, Del., a corporation of Delaware No Drawing. Application July 26, 1937, Serial No. 155,781

10 Claims. (Cl. 260—457)

This invention relates to new chemical compounds, their methods of manufacture, and their technical uses, and more particularly to the preparation and use of new and improved surface active agents.

This invention has an an object the preparation of new chemical compounds possessing surface active properties, which can be used as detergents, wetting agents, emulsifying agents, dye bath assistants, and textile assistants. A further object is to prepare these new compounds by novel and easily conducted methods which give high yields of products of good quality. A still further object is to apply these new products in various technical relations wherein surface active compounds are commonly employed. Other objects will appear hereinafter.

These objects are accomplished by the following invention which relates to the production and uses of alkyl substituted aryl sulphates wherein the alkyl group contains eight or more carbon atoms and the sulphate group is directly attached to a carbon atom in the aryl nucleus.

The following examples illustrate but do not limit the manner in which this invention may be carried out.

Example 1

To 20 grams of decyl phenol (prepared by alkylating phenol with n-decyl alcohol in the presence of zinc chloride) in 100 cubic centimeters of anhydrous ethyl ether were added, slowly, with stirring, at a temperature of 0–10° C., a solution of 11 grams of chlorosulphonic acid in 10 cubic centimeters of ethyl ether. After all the acid solution had been added, the sulphation mass was stirred 15 minutes and poured into a mixture of ice and excess 50% caustic soda solution. The ether was evaporated off, and the aqueous solution then evaporated to dryness on a steam bath under reduced pressure. The solid residue was extracted with methanol to remove the sulphate ester, the methanol solution diluted with water and extracted twice with petroleum ether. The extracted solution was evaporated to dryness. The product was a white, waxy solid soluble in water with foaming.

Example 2

To 20 grams of pyridine cooled to 0° C., were added 10 grams of chlorosulphonic acid, and the temperature allowed to rise to 20° C. To this mixture was added a solution of 20 grams of dodecyl phenol in 60 grams of pyridine at room temperature. After the addition, the contents of the flask were stirred 25 minutes and then poured into ice water and neutralized with a 10% caustic soda solution. The solution was evaporated to dryness, and the product purified as in Example 1. The product was a solid soluble in water with foaming.

The compounds disclosed in the preceding examples are salts of alkyl phenyl sulphates and not salts of alkyl phenol sulphonic acids. This is shown by the fact that the compounds disclosed in the examples can be hydrolyzed by strong acid and thereby converted back to the alkyl phenol, which was the starting material.

The higher alkyl phenyl sulphates possess excellent surface active properties. They are wetting agents or detergents, depending upon the size and configuration of the alkyl group. By altering the nature of the substituent alkyl groups, the surface active properties can be changed. The salts of the higher alkyl phenyl sulphates are stable solids. They can be prepared dry and do not decompose on standing.

The alkyl phenols which it is preferred to employ in this invention are prepared by alkylating a lower phenol with an aliphatic alcohol using sulphuric acid, zinc chloride, or boron trifluoride as a catalyst. If a normal primary alcohol is used, the secondary alkyl phenol is formed, as the reaction does not appear to be a simple splitting out of water between the alcohol and phenol. Using dodecyl alcohol and phenol, the reaction is believed to go as follows:

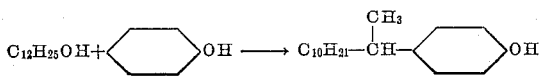

Any of the higher alkyl phenols disclosed in Bousquet application, Serial Number 4,635, filed February 2, 1935, may be used as intermediates for preparing higher alkyl aryl sulphates coming within the purview of the present invention.

Other higher alkyl phenols which may be sulphated according to the present invention include mono-alkyl phenols such octyl phenol, cetyl phenol, octadecyl phenol, oleyl phenol, (2-ethyl hexyl) phenol; poly-alkyl phenols such as dioctyl phenol, dodecyl cresol, cetyl cresol, trioctyl phenol; substituted alpha and beta naphthols such as decyl naphthol, dodecyl naphthol; and phenols containing cyclic side chains such as cyclohexyl-cyclohexyl phenol and tetrahydro-naphthyl phenol.

The higher alkyl aryl sulphates of the present invention may be prepared by treating any of the higher alkyl phenols disclosed in the preceding paragraphs by any one of the usual sulphating methods. The sulphating agents which I prefer to employ in this invention are chlorosulphonic acid in ethyl ether and sulphur trioxide in pyridine. While I prefer to sulphate using chlorosulphonic acid in ethyl ether and sulphur trioxide in pyridine, it is also possible to use pyridine and potassium pyrosulphate, sulphur trioxide in dimethyl aniline, sulphuric acid in ethyl ether, sulphur trioxide in ethyl ether, sulphur trioxide in liquid sulphur dioxide, amino sulphonic acid, chlorosulphonic acid in diethyl aniline, or other well known methods of sulphation. The procedure or sulphation can also be varied so that a solution of the surface active agent instead of a solid is obtained. In some cases, the former is the preferable form for the product.

While I prefer to use sodium hydroxide to neutralize these sulphated phenols, it is also possible to neutralize with other inorganic bases such as lithium hydroxide, potassium hydroxide, sodium carbonate, ammonia, or with such organic bases as trimethyl amine, triethanol amine, tetramethyl ammonium hydroxide, or methyl glucamine. When in the claims I mention an alkyl substituted aryl sulphate, I intend to refer generically to the products of the present invention irrespective of whether or how the acidic hydrogen of the sulphate group may have been neutralized.

The compounds disclosed in this application constitute a new class of surface active agents. They are useful as wetting agents, detergents, lime-soap dispersing agents, dye bath assistants, emulsifying agents, penetrating agents, as a component of printing pastes, as wetting and spreading agents in fungicide and insecticide preparations, and, in general, they are useful wherever a compound with surface active properties is desired.

The above description and examples are intended to be illustrative only and not to limit the scope of the invention. Any departure therefrom which conforms to the spirit of the invention is intended to be included within the scope of the appended claims.

I claim:

1. An alkyl substituted aryl sulphate of the benzene and naphthalene series wherein an alkyl group contains at least eight carbon atoms and the sulphate group is directly attached to a carbon atom in the aryl nucleus.

2. An alkyl substituted aryl sulphate of the benzene and naphthalene series wherein an alkyl group contains at least eight carbon atoms and is derived from a normal primary aliphatic alcohol containing eight or more carbon atoms and the sulphate group is directly attached to a carbon atom in the aryl nucleus.

3. An alkyl substituted aryl sulphate wherein an alkyl group contains from eight to eighteen carbon atoms and is derived from a normal primary aliphatic alcohol containing from eight to eighteen carbon atoms, the aryl radical belongs to the benzene series, and the sulphate group is directly attached to a carbon atom in the aryl nucleus.

4. An alkyl substituted phenyl sulphate wherein the alkyl group contains from eight to eighteen carbon atoms and is derived from a normal primary aliphatic alcohol containing from eight to eighteen carbon atoms and the sulphate group is directly attached to a carbon atom in the phenyl nucleus.

5. An alkali metal salt of an alkyl substituted phenyl sulphate wherein the alkyl group contains from eight to eighteen carbon atoms and is derived from a normal primary aliphatic alcohol containing from eight to eighteen carbon atoms and the sulphate group is directly attached to a carbon atom in the phenyl nucleus.

6. A process of preparing an alkali metal salt of an alkyl substituted phenyl sulphate as defined in claim 5 which comprises reacting a sulphating agent with an alkyl phenol wherein the alkyl group contains from eight to eighteen carbon atoms and is derived from a normal primary aliphatic alcohol containing from eight to eighteen carbon atoms.

7. The sodium salt of decyl phenyl sulphate.

8. A process of preparing the sodium salt of decyl phenyl sulphate which comprises adding an ethyl ether solution of chlorosulphonic acid to an ethyl ether solution of decyl phenol, stirring the reaction mixture, and neutralizing the sulphated decyl phenol with a caustic soda solution.

9. The sodium salt of dodecyl phenyl sulphate.

10. A process of preparing the sodium salt of dodecyl phenyl sulphate which comprises adding a pyridine solution of dodecyl phenol to a pyridine solution of chlorosulphonic acid, stirring the reaction mixture, and neutralizing the sulphated dodecyl phenol with a caustic soda solution.

JOSEPH L. RICHMOND.